Aug. 5, 1941.      C. V. LOSEY      2,251,747
PUSHER-TYPE SOLENOID
Filed March 6, 1939
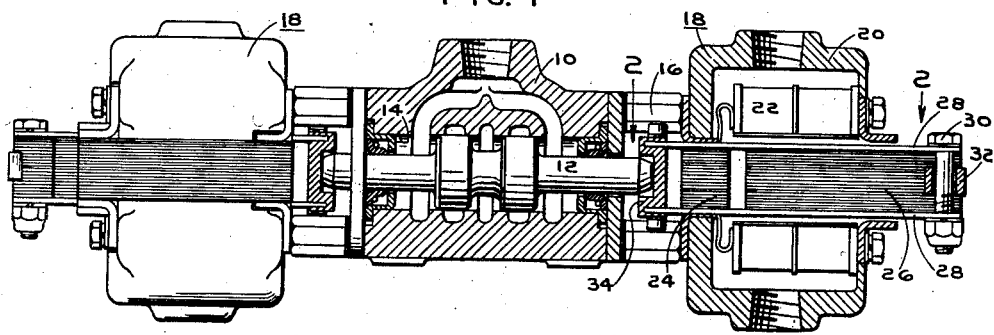
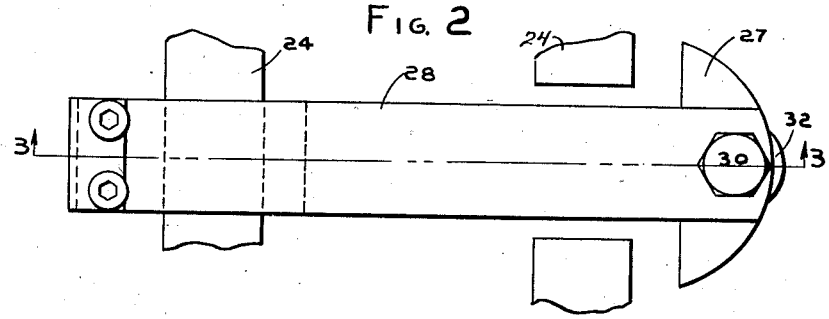
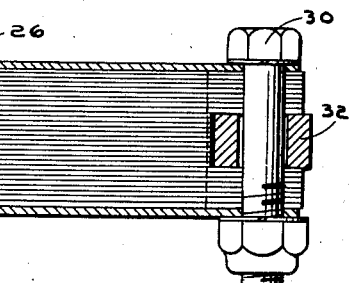 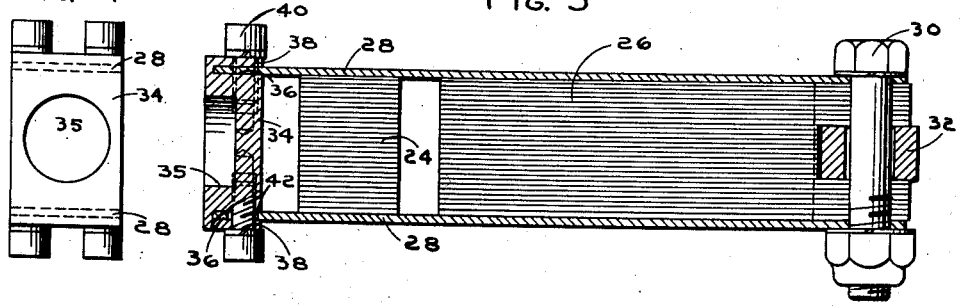
INVENTOR
CLIFFORD V. LOSEY
BY
ATTORNEY Patented Aug. 5, 1941

2,251,747

UNITED STATES PATENT OFFICE 2,251,747

PUSHER-TYPE SOLENOID

Clifford V. Losey, Detroit, Mich., assignor to Vickers Incorporated, Detroit, Mich., a corporation of Michigan Application March 6, 1939, Serial No. 260,118

4 Claims. (Cl. 175—341)

The present invention concerns electromagnetic solenoid constructions of the class used for shifting a movable element to be controlled between two or more positions. Solenoids of this class are frequently utilized for operating the valves of a hydraulic power transmission system and are illustrated in the following disclosure as adapted for that use.

Considerable difficulty has been experienced in the past with solenoids of this character due to premature failure of the operating connection between the movable core of the solenoid and the valve spool which it operates. Devices such as a valve spool, and which are very sensitive to misalignment between the spool and the operating connection if the latter be rigid, have heretofore been connected to the solenoid core through linkage permitting wide latitude in misalignment without exerting sidewise forces on the valve spool. It has been found more expedient in the past to so connect the solenoid core to the valve spool that it pushes on the latter when the solenoid is energized rather than the opposite connection where the solenoid core pulls on the valve spool. This is largely due to the impossibility of providing satisfactory connection between the solenoid core and the valve spool for the pull type solenoid. The connecting mechanism between the solenoid core and the valve spool or other operated device is subjected to extremely severe strains and operations which require repeated actuation of the solenoid. The action of the solenoid is extremely rapid and positive and as a consequence exerts rather high impact and vibrational forces on the connecting mechanism.

It is an object of the present invention to provide an improved push bar construction for solenoids of the character described above which will provide a compact and inexpensive connection having a long trouble-free life substantially equal to the life of the solenoid and valve.

Further objects and advantages of the present invention will be apparent from the following description, reference being had to the accompanying drawing wherein a preferred form of the present invention is clearly shown.

In the drawing:

Figure 1 is a longitudinal cross section of a solenoid-operated valve embodying a preferred form of the present invention.

Figure 2 is a fragmentary sectional view taken along the line 2—2 of Figure 1.

Figure 3 is a sectional view of the push bar taken along the line 3—3 of Figure 2.

Figure 4 is an end view of the push bar construction illustrated in Figure 3.

Referring now to Figure 1, there is illustrated a conventional spool-type four-way valve 10 having a movable spool 12 shiftable in the bore 14 of the valve body. The spool 12 is illustrated in its neutral or mid position and is adapted to be moved either to the right or left to change the port connections in the valve.

At each end of the valve there is mounted by means of spacer screws 16 a solenoid generally designated as 18. The latter comprises a casing 20 within which is mounted a coil 22 and a stationary field core 24. The latter is formed in the shape of a rather square C as is well known in the art. Slidably mounted within the coil 22 is a movable armature core 26 having a T-shaped head 27 as seen in Figure 2. The cores 24 and 26 are formed of iron laminations secured together by the customary rivets or other suitable means, not shown. When the coil 22 is energized from a suitable source of current, not shown, the armature 26 is attracted to the left thus closing the gaps in the magnetic circuit as is well known in the art.

For the purpose of connecting the armature 26 to operate the spool 12 there is provided a push bar construction comprising a pair of straps 28 of non-magnetic material such as brass, the right-hand ends of which are secured to the right-hand end of the armature 26 by a through bolt 30. Preferably a portion of the laminations in the center of the armature have a cut-out portion to provide room for a solid spacer washer 32, thus reducing the number of laminations in compression by the bolt 30. This construction greatly reduces the danger of loosening of the parts at bolt 30 in service.

The straps 28 extend beyond the left-hand end of the armature 26 and through the casing 20 into the space between the same and the body of the valve 10. The straps 28 are freely slidable in the space between the field core 24 and the casing 20. At their left-hand ends the straps 28 are joined together by a push plate 34 formed of wear-resisting material such as hardened steel. The push plate 34 is provided with a recess 35 in which the projecting end of the spool 12 is receivable with generous lateral clearance. The push plate is provided on its back face with a pair of deep slots 36 formed adjacent the top and bottom edges thereof and adapted to receive the ends of the straps 28. The construction is such that a resilient finger portion 38 is provided by the metal lying beyond the slots 36.

This finger portion is clamped to the flat side of the straps 28 by means of a pair of cap screws 40 threaded into the push plate 34 and having substantial clearance with holes 42 formed in the straps 28.

In assembly the push plate 34 is assembled onto the ends of the straps 28 as shown with the end portions thereof in tight abutment with the bottoms of the slots 36. The cap screws 40 are then inserted and tightened down, thus clamping the straps 28 between the main body of the plate 34 and the resilient fingers 38. It will be seen that this construction provides a push bar in which the push plate 34 is firmly attached to the straps 28 by a clamping action extending over a large area of the flat sides of the straps 28. There are no abrupt changes in cross section where stresses may be concentrated in the straps 28. In addition the resilient nature of the fingers 38 distributes stress evenly along a significant part of the length of the straps 28 in much the same manner as one grasps a flat key for insertion into a cylinder lock. This provides for a rather evenly distributed transmission of force from the push plate 34 to the straps 28 and insures against failure of the push bar after repeated operations due to the extremely severe shock loads which are imposed upon it.

The present construction has been found in life tests to have several times the satisfactory operating life of any previously available constructions for the same class of service. Solenoids embodying the present construction have successfully withstood three million repeated strokes comprising a forward and reverse movement of the solenoid core whereas the best previously available constructions fail after less than a hundred thousand such strokes.

While the form of embodiment of the invention as herein disclosed constitutes a preferred form, it is to be understood that other forms might be adopted, all coming within the scope of the claims which follow.

What is claimed is as follows:

1. A push bar construction for a solenoid having a stationary field core and a movable armature comprising a pair of straight, flat straps of non-magnetic material adapted to be secured to two opposite sides of the armature at one end of the straps, the opposite end of the straps extending beyond the field core and carrying a pusher plate of wear-resisting material, said pusher plate having a pair of slots formed in its back face and spaced from the edges of the plate by approximately the thickness of a strap, and means for clamping the sides of said slots together to engage the flat sides of the straps inserted therein.

2. A push bar construction for a solenoid having a stationary field core and a movable armature comprising a pair of straight, flat straps adapted to be secured to two opposite sides of the armature at one end of the straps, the opposite end of the straps carrying a pusher plate, said pusher plate having a pair of slots formed in its back face and spaced from the edges of the plate by approximately the thickness of a strap, and means for clamping the sides of said slots together to engage the flat sides of the straps inserted therein.

3. A push bar construction for a solenoid having a stationary field core and an armature translatable along the solenoid axis toward the field core when the solenoid is energized comprising a pair of straight, flat straps adapted to be secured to two opposite sides of the armature at one end of the straps, the opposite end of the straps extending across the field core and carrying a pusher plate on the side of the field core opposite the armature, said pusher plate having means formed thereon for clamping against both faces of the end of each strap on its flat sides over a lengthwise distance equal to at least one-third of the strap width.

4. A push bar construction for a solenoid having a stationary field core and an armature translatable along the solenoid axis toward the field core when the solenoid is energized comprising a pair of straight, flat straps adapted to be secured to two opposite sides of the armature at one end of the straps, the opposite end of the straps extending across the field core and carrying a pusher plate on the side of the field core opposite the armature, said pusher plate having means engaging both flat faces of each strap over substantially the full width thereof with a purely clamping engagement, the ends of the straps being in abutting engagement with the push plate.

CLIFFORD V. LOSEY.